T 856,021

BEST AVAILABLE COPY

DEFENSIVE PUBLICATION

T856,021

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED NOVEMBER 12, 1968

856 O.G. 336

T 856021

668,665

CATALYST FOR CONVERTING ACETYLENE TO MONOVINYLACETYLENE

Carl Albert Aufdermarsh, Jr., Wilmington, Del., assignor to E. I. du Pont de Nemours and Company, Wilmington, Del., a corporation of Delaware

Filed Sept. 18, 1967. Published Nov. 12, 1968

Class 252—429

No Drawing. 8 Pages Specification

A non-aqueous catalyst for converting acetylene to monovinylacetylene, said catalyst comprising essentially two phases made by combining:

(1) a solution of
  (a) cuprous chloride,
  (b) a quaternary ammonium chloride having six to 12 carbon atoms such as butyltrimethylammonium chloride, the molar ratio of said quaternary ammonium chloride to said cuprous chloride being from 0.7:1 to 1.2:1; and
  (c) from two to 20 percent by weight of said catalyst phase (1) of N-methylpyrrolidone with (2) an alkylated aromatic hydrocarbon extender having a single aromatic ring, a boiling point from about 100° C. to about 250° C. and a solubility in said catalyst phase (1) of from one to 20 weight percent, the volume ratio of said catalyst phase (1) to said extender phase (2) being from 1:4 to 4:1.

The aromatic hydrocarbon extender can be tetrahydronaphthalene, diisopropylbenzene (including isomers and mixtures of isomers thereof), cumene, xylene and toluene.

The use of the above catalyst significantly reduces tar buildup in the catalyst phase and results in a tar which can be effectively extracted solely by separating and processing the extender phase.